Figure 1:
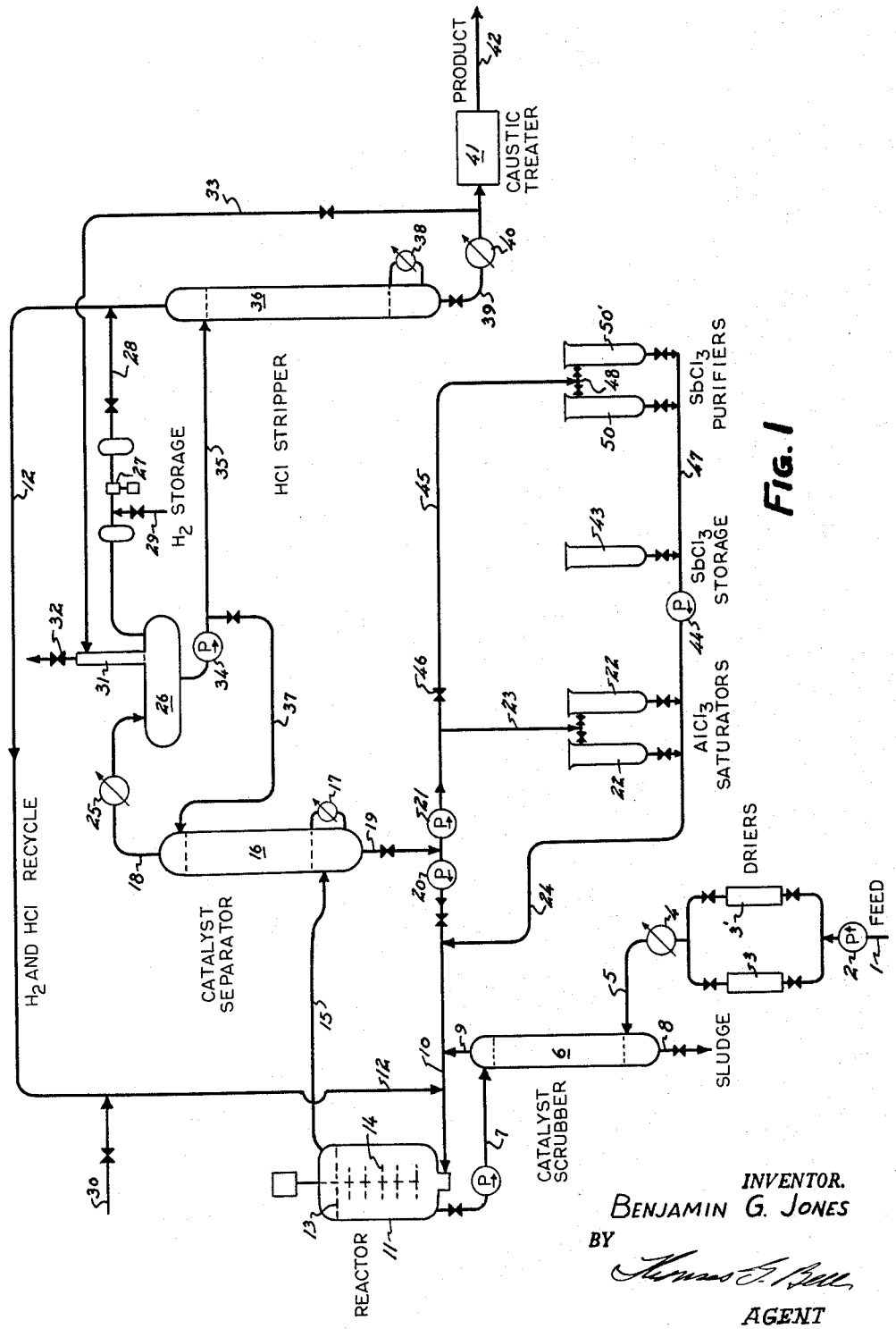

INVENTOR.
BENJAMIN G. JONES 3,119,885
ISOMERIZATION CATALYST REACTIVATION
Benjamin G. Jones, Concord, Calif., assignor to Tidewater Oil Company, Los Angeles, Calif., a corporation of Delaware
Filed Oct. 6, 1960, Ser. No. 60,960
6 Claims. (Cl. 260—683.75)

This invention relates to the isomerization of light hydrocarbons in the liquid phase using aluminum chloride catalyst dissolved in molten antimony trichloride. More particularly, it relates to the reconditioning of antimony trichloride, used in such an isomerization process, which has become contaminated with certain deleterious reaction products produced during abnormal operation of the process.

Anhydrous aluminum chloride is one of the most widely used catalysts for the isomerization of light hydrocarbons such as butane and pentane, especially in the production of isobutane and isopentane from their normal isomers. In one known commercial process, the normal paraffin is contacted in the liquid phase with molten antimony trichloride containing the aluminum chloride catalyst in solution, the reaction being carried out at a temperature sufficient to keep the antimony trichloride melted and at a pressure at least sufficient to maintain the hydrocarbons substantially in liquid phase. The reaction is carried out in the presence of hydrogen chloride, which promotes the isomerization activity of the aluminum chloride, and when hydrocarbons heavier than butane are isomerized, also in the presence of hydrogen, which suppresses unwanted disproportionation reactions. During operation of the process the aluminum chloride becomes gradually converted to aluminum chloride-hydrocarbon complexes, commonly referred to as "sludge," which sludge is removed from the process and is replaced by fresh aluminum chloride, while the antimony trichloride carrier or solvent is recycled to the process. Separation of the sludge from the antimony trichloride is accomplished by dissolving the latter in the hydrocarbon feed, leaving the hydrocarbon-insoluble sludge as a heavy liquid layer, readily withdrawn from the equipment.

However, at times I have found that a peculiar abnormal situation may occur during the operation of such a liquid phase isomerization process, particularly when the charge to the process comprises pentane. Distillation tests run periodically on the product show an increase in the boiling point, indicating a decrease in the isopentane content along with a substantial increase in hydrocarbons heavier than pentane. At the same time, the temperatures at the isomerization reactor change so that there is no longer the usual difference in temperature between the inlet and outlet of the reactor, indicating a severe reduction in the isomerization reaction. Although the plant is carefully regulated in an effort to restore normal operating conditions, low conversion continues and rapidly becomes worse until the isomerization may practically cease. I have found that in this situation a color check of the catalyst mixtures will show that its normal claret or rosé color has become blackened and the entire catalyst has a dirty brown-black appearance.

Exactly what has led to these conditions is not certain, but, whatever the cause, the problem, once it occurs, becomes acute and the plant has had to be shut down and the entire catalyst discarded. Replacement of the antimony trichloride is expensive, not only because of the cost of the high-priced material but also due to the difficulties involved in the disposal of the contaminated material.

Therefore, an important problem which this invention solves is how to keep the isomerization reaction at its proper maximum efficiency and how to purify catalyst which does become fouled without having to discard the entire catalyst mixture.

Upon studying the aforementioned darkened catalyst mixture, I have found that it contains contaminating material differing from the earlier-mentioned hydrocarbon-insoluble sludge by being soluble in hot hydrocarbons. Apparently certain aluminum chloride-hydrocarbon complexes have been formed which are soluble in the hot hydrocarbon feed and therefore cannot be separated from the antimony trichloride in the same manner as the sludge. Whenever these complexes are produced, they are dissolved in the feed along with the antimony trichloride and remain with the antimony trichloride in the system, greatly interfering with the desired catalytic reaction and tending to build up in amount until they substantially stop the isomerization reaction. For convenience and to distinguish this contaminating material from the earlier-mentioned hydrocarbon-insoluble sludge, these complexes may be referred to hereafter as "tarry-complex," "pentane tar" or simply as "tar," although they are different from ordinary tar and, when separated from the catalyst mixture as hereinafter explained, are often in the form of a brown-black liquid of about the consistency of diesel fuel.

I have found that, when the circulating stream of antimony trichloride in such a liquid phase isomerization process has become contaminated by this tar, the tar may be removed and a satisfactory antimony trichloride recovered for further use by crystallization of the latter. Upon cooling the contaminated liquid, adequately pure antimony trichloride will crystallize in a solid body, leaving the tar as a supernatant oily liquid which may readily be removed by flushing with a cold hydrocarbon liquid. My procedure may be used to revivify all the antimony trichloride in the process system when it has become so contaminated with tar that the isomerization process has become practically inoperative. My procedure may also be modified to continually remove small quantities of tar, as they form, by continuously (or intermittently) treating a side stream of the antimony trichloride circulating in the isomerization process.

Figure 2:
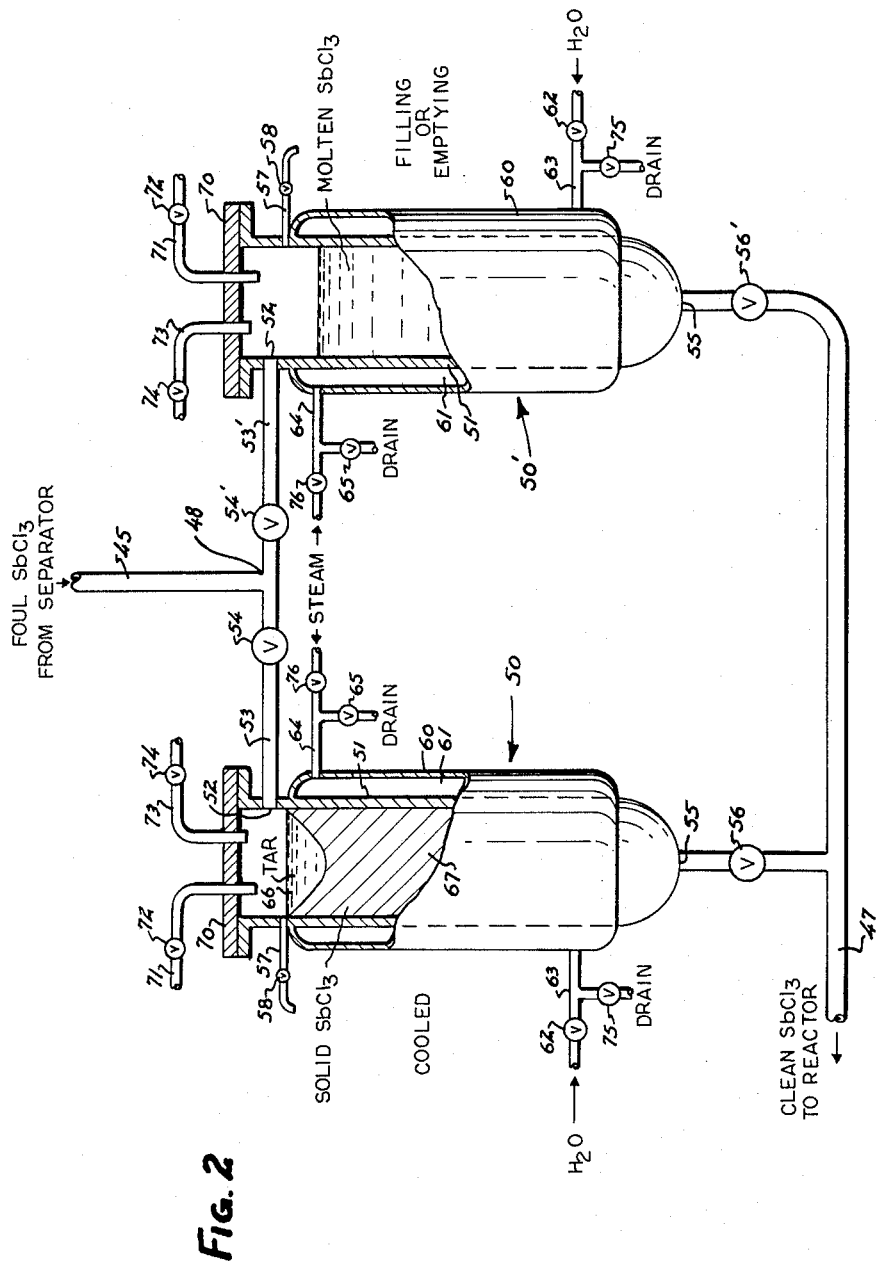

The invention may better be understood by reference to the drawing wherein:

FIG. 1 is a schematic flow diagram of a typical liquid phase isomerization process, with features added for practicing the invention, and FIG. 2 is a representation of apparatus suitable for carrying out the crystallization procedure of the invention.

Referring to FIG. 1, liquid hydrocarbon feed (i.e., normal pentane) in line 1 is charged by pump 2 through driers 3 and 3' alternately, one being on stream while the other is being regenerated. The dessicant may be activated alumina, or other suitable material. The dried stream then passes through heater 4 where the temperature is raised above the melting point of $SbCl_3$ and preferably to within 20 or 30 Fahrenheit degrees of the final reaction temperature. The reaction supplies the remainder of the heat. From heater 4 the feed passes through line 5 to the bottom of catalyst scrubbing column 6 where antimony trichloride and free aluminum chloride are countercurrently extracted from a reject catalyst stream entering the top of column 6 through line 7. Spent aluminum chloride sludge, not dissolved by the feed stream, is discharged through line 8.

The hot hydrocarbon stream, now containing dissolved antimony trichloride and aluminum chloride, flows from the top of column 6, through lines 9 and 10 and into reactor 11. In line 10 the hydrocarbon stream is combined with recycle hydrogen and HCl from line 12 and with recycle catalyst stream in line 10.

Reactor 11 is filled to level 13 with the reaction mixture comprising hydrocarbons, hydrogen, hydrogen chloride, and the molten antimony trichloride containing in solution about 0.5 to 4.0% of active aluminum chloride catalyst. Reactor 11 may be equipped with stirring devices 14, or other contacting means. A suitable baffle may be provided just above level 13 to permit a quiescent zone thereabove in which undissolved catalyst mixture may separate as a dense phase and return to the reaction zone.

In normal operation a small amount of aluminum-chloride complex (sludge) is formed, which is insoluble in the feed but soluble in the $SbCl_3$—$AlCl_3$ catalyst mixture. To avoid accumulation of the inert complex in the system, a small catalyst stream is withdrawn through line 7 and injected into the top of scrubber 6. As the catalyst so injected descends through the column, $SbCl_3$ and active $AlCl_3$ are countercurrently extracted by the preheated feed, and the inert sludge remains as an insoluble liquid residue which is withdrawn through line 8.

The reacted hydrocarbon mixture, saturated with $SbCl_3$ and $AlCl_3$ and containing both isoparaffin and unreacted normal paraffin in roughly equilibrium proportions, passes from the top of reactor 13, through line 15, to catalyst removal column 16 heated by reboiler 17. In column 16 the hydrocarbons, hydrogen and HCl are distilled off as overhead product, leaving through line 18, and the antimony trichloride containing the aluminum chloride in solution is withdrawn as a bottoms stream through line 19 and returned by pump 20 to reactor 11 through line 10. To supply make-up $AlCl_3$ catalyst to the system (to compensate for that converted to sludge and discarded through line 8), a portion of the stream in line 19 is pumped by pump 21 through saturator 22, via line 23, and returned to line 10 via line 24.

This side stream of antimony trichloride passes through a bed of solid anhydrous aluminum chloride in saturator 22 (which is preferably a dual unit comprising two steam-jacketed vessels, one being on-stream while the other is being recharged with $AlCl_3$) dissolving part of the $AlCl_3$ to supply the make-up. The desired rate at which the $AlCl_3$ make-up is supplied to the system may be controlled by the volume of the side-stream withdrawn by pump 21.

The overhead products leaving column 16 are cooled in condenser 25 and passed to accumulator 26 where the hydrocarbons and dissolved HCl are separated from the gaseous hydrogen. The separated hydrogen is compressed by compressor 27 and recycled to the process through lines 28 and 12. Make-up hydrogen may be supplied to the intake of compressor 27 through line 29 or elsewhere as desired as, for example, into line 12 through line 30. To avoid build-up of uncondensed light hydrocarbons in the hydrogen recycle, a small portion of the hydrogen is vented through a small vent-gas absorber column 31 and valve 32. Suitable absorption oil may be supplied to absorber 31 by line 33.

The hydrocarbons separating in accumulator 26 are withdrawn by pump 34 and charged to the top of HCl stripping column 36 through line 35, a small portion being diverted through line 37 to supply reflux to column 16. Heat is supplied to stripper 36 by reboiler 38 to boil off the dissolved HCl from the hydrocarbon product. The HCl leaving the top of the column through line 12 is recycled to the process. The hydrocarbon product leaving the bottom of column 36 through line 39 is cooled in cooler 40, washed with alkaline solution to remove traces of HCl in treater 41, and passed to fractionating equipment (not shown) through line 42.

Make-up $SbCl_3$, may be supplied to the system from a steam-jacketed storage vessel 43 by means of pump 44. Make-up HCl may be supplied to the system through line 30. As is obvious, suitable insulation, steam-jackets, and/or steam-tracing are used on all vessels and lines containing the molten $SbCl_3$ or mixtures thereof with $AlCl_3$. As is also obvious, columns 6, 16, 31 and 36 are provided with trays or other suitable contacting devices.

Up to this point, the foregoing description of FIG. 1 illustrates briefly a typical installation of a known isomerization process which has been in use for many years. If desired, further details of this type of isomerization process may be found in a paper by S. H. McAllister, W. E. Ross, H. E. Randlett and G. J. Carlson entitled, "The Liquid-Phase Isomerization of Normal Paraffins Using a Fluid Salt Catalyst" and published in Transactions of the American Institute of Chemical Engineers, volume XLII (1946), pp. 33–53. The description has been given to illustrate the principal steps during normal operation and to provide a setting to illustrate the application of the present invention when operation of the process becomes inadvertently abnormal, and should not necessarily be considered as limiting the invention in its broadest scope.

The cause of the abnormal operation which is accompanied by the formation of tarry complexes in the catalyst mixture, the elimination of which is the subject of the present invention, is not known and might be due to one or more of the following: insufficient hydrogen concentration, excessive aluminum chloride concentration, excessive reaction time, impurities in the pentane feed, and/or excessive temperatures. However, regardless of cause, the presence of the tar in the system, if not promptly eliminated, seems to produce more tar with rapid inactivation of the entire catalyst. Such abnormal operation may be indicated by any or all of several factors. Distillation tests run periodically on the product issuing through line 42 may show an increase in the boiling point, indicating a decrease in the isopentane content relative to the normal pentane content and also indicating the presence of abnormal amounts of higher boiling compounds. Simultaneously, the temperatures at the reboiler 17 usually will climb, and there will be a reduced difference in temperature between the inlet and outlet of the reactor 11. I have found that these factors indicate the likelihood of tar formation and the nullification of the isomerization reaction. The presence of tar may be verified by a color check of the catalyst mixture at reboiler 17, the normal claret or rosé color of the mixture being blackened. So far as I know, this problem has not heretofore been recognized or solved, short of discarding all the antimony trichloride and its contents when the isomerization reaction ceased to occur, with attendant high cost for replacing with expensive fresh material.

The present invention recognizes this problem and provides a way of removing the tarry complex from the catalyst mixture and purifying the latter for reuse. For this purpose a side line 45 is provided, connected to the line 23 through a valve 46, while a return side line 47 is connected to the inlet side of the pump 44. The line 45 leads via a T 48 to a pair of antimony trichloride purifiers 50 and 50', which, in turn, are connected to the line 47. By this means a side stream of antimony trichloride with dissolved aluminum chloride and contained impurities is drawn off from the main system, is purified to remove the tar, and is then put back into the system through line 47 and pump 44.

Two identical purifiers 50 and 50' are shown by way of example, but there may be only one purifier or there may be several. In any event, FIG. 2 shows a suitable form of purifier. As illustrated, each purifier 50, 50' has a tank 51 with an upper inlet 52 connected by line 53 or 53' and valve 54 or 54' to the T 48. Each tank 51 also has a bottom outlet 55 connected to the line 47 through a valve 56 or 56'. When the purifier 50 is to be used, its valve 56 is closed and its valve 54 is opened, and the valve 46 is opened so that the contaminated antimony trichloride flows into the tank 51, preferably until flow through a spillway tube 57 indicates that the tank 51 has been filled to a desired level; then the valve 54 is closed, and a valve 58 in the spillway tube 57 is also closed.

Each tank 51 is contained in a housing 60 that is spaced from the outer wall of the tank 51 to provide a chamber 61 in which heat-exchange fluid can circulate first to cool and then to heat the antimony trichloride. When the tank 51 is filled and its valves closed, or earlier if desired, cool water is circulated through the chamber 61, preferably entering through a valve 62 and pipe 63 at the lower end of the chamber 61 and leaving through a pipe 64 and drain valve 65 near the upper end. As the cool water removes heat from the molten salt, the salt mixture cools below its freezing point and begins to crystallize on the walls of the tank 51, building up gradually toward the center. I have found that the tarry complex is excluded from the crystals and accumulates in a pool at the top, so that when crystallization is complete the appearance is somewhat like that shown in the purifier 50 in FIG. 2: a small pocket of tar 66 lies at the top of the crystallized salt 67, and this small pocket contains almost all the tar.

At this point the tar can be flushed out by a stream of cool liquid hydrocarbon (such as the pentane feed). The force of the liquid drives out the tar, which is largely insoluble in cool hydrocarbons, though soluble in hot hydrocarbons. For this purpose the cover 70 of the tank 51 is provided with an inlet pipe 71 for flushing fluid, having a valve 72 therein, and there is also an outlet pipe 73, which may have a valve 74. Flushing is brief, being carried on until the outlet stream is clear.

With the salt purified, the aluminum chloride having crystallized with the antimony trichloride, the next step is to melt the crystallized catalyst mixture. For this purpose, the valve 62 may be closed to shut off the cold water and a valve 75 opened to drain the remaining cold water from the chamber 61. Then, with the valve 65 closed, a valve 76 is opened to admit steam to the chamber 61, the cooled steam or condensate leaving through the valve 75. When the antimony chloride (with its dissolved aluminum chloride) is again molten and at the desired temperature (as shown in FIG. 2 in the purifier 50') the valve 56' is opened and the purified molten salt flows through the line 47 to the pump 44 and back into the system.

By having two or more purifiers 50 and 50', the purification may be carried on by alternating the tanks, one being in the cooling stage while another is being heated, drained, and refilled. Each goes through the same sequence but one at a time, so that the process may be carried on as a continuous purification.

EXAMPLE 1

During the operation of a liquid phase isomerization plant, isomerizing n-pentane to isopentane, similar to that described above in relation to FIG. 1 and normally operating under conditions approximating those shown in the accompanying Table, it may be found that the catalyst has become contaminated with complex which is not removed with the sludge normally discharged from the catalyst scrubber.

*Table*

ILLUSTRATIVE NORMAL OPERATING CONDITIONS PENTANE ISOMERIZATION

| | |
|---|---|
| Charge, bbls./day | 1700 |
| Composition of charge (including recycle): | |
| Normal pentane _____percent__ | 90.7 |
| Isopentane _____do____ | 6.1 |
| Other _____do____ | 3.2 |
| | 100.0 |
| Contactor conditions: | |
| Inlet temperature ° F__ | 175 |
| Outlet temperature ° F__ | 200 |
| Pressure p.s.i.g__ | 300 |
| Catalyst to hydrocarbon volume ratio | 1:1 |
| AlCl₃ content of catalyst _____percent__ | 3 |
| Average contact time, min | 12 |
| LHSV | 2.5 |
| HCl content of feed _____weight percent__ | 5 |
| Hydrogen concentration in feed _mole percent__ | 1.3 |
| Yield per pass, percent: | |
| Isopentane | 60.5 |
| Normal pentane (recycled) | 35.0 |
| Other | 4.4 |
| Hydrocarbon lost to sludge | 0.1 |
| | 100.0 |

The contamination results in partial or complete suppression of the catalytic reaction, reducing the n-pentane to isopentane conversion from the normal 60% to as low as 20% or less with correspondingly reduced temperature-rise in the reactor and increased temperature in the reboiler of the catalyst separator. Although reduced yield may be caused by other abnormal operating conditions (e. g., insufficient HCl concentration), the presence of tarry complex may be verified by blackness of the catalyst mixture as observed in a sight glass at the bottom of the catalyst separator tower. (Other laboratory tests on a sample of the catalyst mixture can be devised to verify the presence of tar.)

To eliminate the tarry complex (as contemplated by the invention), the operation of the entire plant is first carefully regulated to eliminate the abnormal condition which caused the formation of the tar and to reduce as far as possible further formation of tar. With the plant otherwise operating normally as far as possible, a stream of catalyst mixture (e.g., 5 gallons per minute) is withdrawn from that normally passing from the catalyst separator to the reactor and pumped into a 70 gallon purifier vessel similar to that shown in FIG. 2. When the purifier is filled, the stream is diverted to another purifier vessel and cooling water is circulated through the jacket of the first purifier until the antimony trichloride has crystallized. When crystallization is complete (as determined by a probe rod inserted through a test-hole in the lid of purifier) the tarry complex, accumulating in a pool at the top of the solid salt and amounting to a few gallons, is flushed out of the vessel by the force of a stream of pentane introduced through an inlet pipe in the lid of the vessel. The pentane stream with the tar suspended therein, leaving through an exit pipe in the lid, is passed to the sewer from which the pentane is recovered by the refinery's normal "slop" recovery system. After removal of the tar from the purifier, the cooling water in the jacket is replaced by steam until the antimony trichloride is melted. The molten salt is then pumped to a storage vessel and the purifier is again filled with another 70 gallon charge of contaminated catalyst mixture, and the foregoing procedure is repeated until all the contaminated catalyst mixture (about 850 gallons) is withdrawn from the isomerization plant.

With the isomerization plant now devoid of catalyst and "idling" on normal pentane with no conversion to isopentane, about five gallons per minute of the reclaimed antimony trichloride is withdrawn from storage and charged to the reactor, bypassing sufficient thereof through the AlCl₃ saturators to provide a 3% AlCl₃ content in the catalyst mixture entering the reactor. When the isomerization system has been filled with the desired amount of catalyst mixture, final adjustment of plant conditions are made to produce normal operations.

EXAMPLE 2

During the operation of a liquid phase isomerization plant, isomerizing n-pentane to isopentane, similar to that described in relation to FIG. 1 and normally operating under conditions similar to those shown in the accompanying table, a slight discoloration of the catalyst mixture leaving the bottom of the catalyst separator tower may indicate that hydrocarbon-soluble tarry complexes have started to form in the system. To eliminate the tar before substantial volumes are formed (without complete inactivation of the plant during purification as in Example 1) five gallons per minute of the catalyst mixture is withdrawn from the bottom of the catalyst separator and charged to a 70 gallon purifier and purified as in Example 1. Simultaneously there is charged to the reactor a like amount of clean antimony trichloride from storage to maintain a substantially constant volume of catalyst mixture in the isomerization system. When the purification cycle is complete in the first purifier, its clean molten antimony trichloride is returned to the reactor while a similar amount of catalyst mixture from the bottom of the catalyst separator is treated in a second purifier. The two purifiers are thus alternated for several days until it has been ascertained that purification is no longer needed.

I claim:

1. In a hydrocarbon isomerization process wherein a normal paraffinic hydrocarbon is contacted in the liquid phase with aluminum chloride dissolved in molten antimony trichloride to convert substantial amounts thereof to the corresponding isoparaffin, the method of removing from the system undesired hot-hydrocarbon-soluble hydrocarbon-aluminum chloride complexes dissolved in the molten antimony trichloride, which comprises: withdrawing contaminated antimony trichloride from contact with the hydrocarbons, cooling the withdrawn antimony trichloride below its melting point thereby producing solidified antimony trichloride while said complexes remain as a liquid phase, separating the liquid phase complexes from the solidified antimony trichloride, melting the separated solidified antimony trichloride and returning the melted antimony trichloride to further contact with the hydrocarbons undergoing isomerization.

2. In a hydrocarbon isomerization process wherein normal pentane is contacted in the liquid phase with aluminum chloride dissolved in molten antimony trichloride to convert substantial amounts thereof to isopentane, the method of removing from the system undesired hot-pentane-soluble hydrocarbon-aluminum chloride complexes dissolved in the molten antimony trichloride, which comprises: withdrawing contaminated antimony trichloride from contact with the pentanes, cooling the withdrawn antimony trichloride below its melting point thereby producing solidified antimony trichloride while said complexes remain as a liquid phase, separating the liquid phase complexes from the soldified antimony trichloride, melting the separated solidified antimony trichloride and returning the melted antimony trichloride to further contact with the normal pentane undergoing isomerization.

3. In a process for isomerization of pentane by a catalyst solution of aluminum chloride in molten antimony trichloride, the purification of said catalyst from aluminum chloride-hydrocarbon complexes soluble in hot pentane, comprising the steps of crystallizing a body of said antimony trichloride with its contained aluminum chloride thereby causing said complexes to rise to the top of said body and flushing said complexes from said body with liquid pentane.

4. In a pentane isomerization process employing as a catalyst a solution of aluminum chloride in molten antimony trichloride, wherein under abnormal conditions hot-hydrocarbon-soluble aluminum chloride complexes form that interfere with the catalytic action of the catalyst, the purification of the catalyst from said complexes by separating the catalyst solution from the pentanes, cooling said solution below its eutectic freezing point to crystallize out the salts while the said aluminum chloride complexes remain liquid and concentrate toward the upper end of the crystallized body of salts, flushing the liquid complexes from the crystallized salt with a stream of hydrocarbons to remove the complexes, heating the salt to remelt it, and re-introducing the molten purified salt into the isomerization process.

5. In a continuous hydrocarbon isomerization process wherein a stream of normal paraffinic hydrocarbon is contacted in the liquid phase with aluminum chloride dissolved in molten antimony trichloride in the presence of activating amounts of hydrogen chloride and restraining amounts of hydrogen to convert substantial amounts thereof to the corresponding isoparaffin and a stream of the contacted hydrocarbons containing antimony trichloride in solution is continuously withdrawn from such contact and continuously distilled to distill off the hydrocarbons, leaving molten antimony trichloride as a residue and the residue is continuously returned to the reaction zone, the method of removing from the system undesired contaminating hydrocarbon-aluminum chloride complexes dissolved in the molten antimony trichloride and soluble in said stream of normal paraffinic hydrocarbon, which comprises: continuously withdrawing a stream of contaminated antimony trichloride residue from the distillation step, cooling successive amounts of the withdrawn antimony trichloride below its melting point thereby producing solidified antimony trichloride while said contaminating complexes remain as a liquid phase, separating the liquid phase complexes from the solidified antimony trichloride, melting the separated solidified antimony trichloride and returning the melted antimony trichloride to further contact with the hydrocarbons undergoing isomerization.

6. In a continuous hydrocarbon isomerization process wherein a stream of normal pentane is contacted in the liquid phase with aluminum chloride dissolved in molten antimony trichloride in the presence of activating amounts of hydrogen chloride and restraining amounts of hydrogen to convert substantial amounts thereof to isopentane and a stream of the contacted pentanes containing antimony trichloride in solution is continuously withdrawn from such contact and continuously distilled to distill off the pentanes and leave molten antimony trichloride as a residue and the residue is continuously returned to the reaction zone, the method of removing from the system undesired contaminating hydrocarbon-aluminum chloride complexes dissolved in the molten antimony trichloride and soluble in said stream of normal pentane, which comprises: withdrawing contaminated antimony trichloride residue from the distillation step until substantially all antimony chloride has been removed from the isomerization process, cooling the withdrawn antimony trichloride below its melting point thereby producing solidified antimony trichloride while said complexes remain as a liquid phase, separating the liquid phase complexes from the solidified antimony trichloride, melting the separated solidified antimony trichloride and returning the melted antimony trichloride to the isomerization process.

References Cited in the file of this patent

UNITED STATES PATENTS

| | | |
|---|---|---|
| 2,360,699 | McAllister et al. | Oct. 17, 1944 |
| 2,421,524 | Ross et al. | June 3, 1947 |
| 2,445,043 | Souders et al. | July 13, 1948 |
| 2,555,340 | Hopper et al. | June 5, 1951 |
| 2,557,326 | Tuwiner | June 19, 1951 |
| 2,983,775 | Thomas | May 9, 1961 |